May 23, 1967 — K. EVANS — 3,321,031

EARTH WORKING IMPLEMENT CONTROL APPARATUS

Filed July 9, 1964

Inventor:
Kenneth Evans

United States Patent Office 3,321,031
Patented May 23, 1967

3,321,031
EARTH WORKING IMPLEMENT CONTROL
APPARATUS
Kenneth Evans, Highton, via Geelong, Victoria, Australia, assignor to International Harvester Company, Chicago, Ill., a corporation of Delaware
Filed July 9, 1964, Ser. No. 381,350
3 Claims. (Cl. 172—605)

This invention relates to earth-working implements and particularly to control means therefor. More specifically, the invention concerns novel control means for implements such as plows, cultivators and the like to adopt them for work under soil conditions which subject the earth-working tools to abnormal draft forces.

In some soils the presence of obstructions to normal implement operation such as rocks, stumps and dense areas of earth and the like, it is customary to mount a plow bottom or other tillage tool on its supporting frame in such a way as to allow the tool to trip rearwardly to avoid damage when an obstruction is encountered, and such a mounting means is shown, for example, in the patent to Jennings 3,022,835. Such mounting means has included spring-held latches which provided successful tripping but required the operator to maneuver his implement to return the tool to its operating position or to reset it. Therefore, an object of this invention is the provision of novel means for automatically returning a tripped plow or the like to its operating position.

In an effort to overcome the disadvantages inherent in the spring-latch type of tripping device, it has been proposed to utilize hydraulic circuits carried on the implement frame and including cylinder and piston units connected to the earth-working tool, the cushion of oil or other fluid in the circuit being utilized to allow the tool to trip and to reset it. Such a mechanism is disclosed in the patent to Ash 2,379,779. A disadvantage in such devices, however, has been the shock imparted to an entire multi-tool implement when one of the tools strikes an obstruction, and another object of this invention, therefore, is the provision of novel hydraulically-operated tripping mechanism for plows, cultivators, and the like, wherein means are provided to absorb the shock occurring when a tool encounters abnormal draft conditions causing it to trip.

Another object of the invention is the provision of novel hydraulic control means for a plow or the like adapted for connection to a draft source, such as a tractor, wherein the forward pull on the implement is utilized to maintain the fluid in the hydraulic circuit on the implement under pressure to maintain the tools in operating position.

A further object of the invention is the provision, in an implement utilizing a hydraulic circuit to maintain the tools in the ground and to accommodate tripping thereof, of a shock absorber in the hydraulic circuit having means for adjusting the resistance of the shock absorber and thus varying the magnitude of the draft load required to trip the tool.

Other objects and advantages of the invention will become clear from the following detailed description when read in conjunction with the accompanying drawings wherein.

Figure 1:
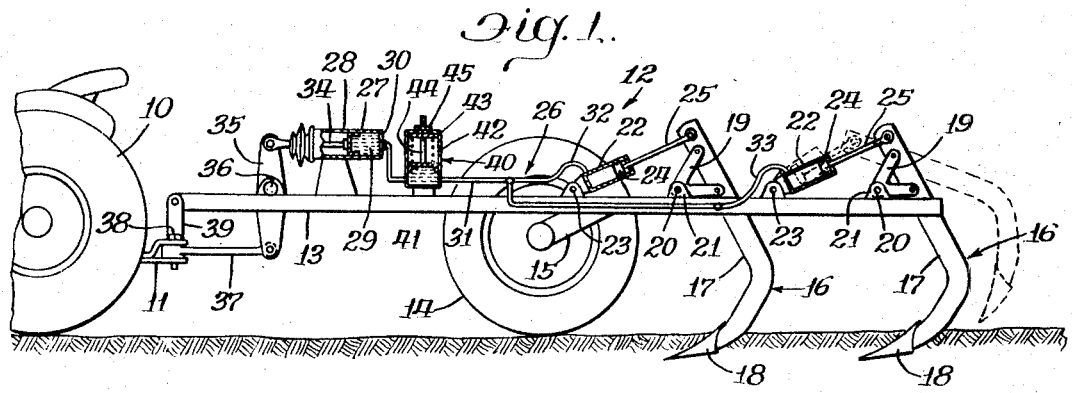
FIGURE 1 is a view in side elevation of an agricultural implement of the field-plow type, shown diagrammatically, connected to the drawbar of a tractor, a hydraulic circuit being illustrated which includes a master cylinder, auxiliary or slave cylinders and a shock absorber.

In the drawings the numeral 10 designates a tractor of any well known type having a drawbar 11 to which is connected a tillage implement generally designated by the numeral 12.

The implement with which this invention is concerned is shown diagrammatically in FIGURE 1 and comprises a supporting frame 13 having a ground-engaging wheel 14 mounted thereon by means of a crank axle 15 suitably carried by the frame for vertical movement relative thereto.

Also mounted on frame 13 are a plurality of earth-working units 16, each said earth-working unit comprising a standard 17 having an earth-penetrating tool 18 at its lower end. A triangularly shaped bracket 19 is secured to standard 17 and is pivotally mounted upon a pin 20 carried by a lug 21 secured to the plow frame to accommodate tripping of the earth-working unit 16 about the axis of pin 20 to a non-operating position as indicated by dotted lines in FIGURE 1.

To maintain each earth-working unit 16 in working position during normal operation while accommodating tripping thereof independently of the others when abnormal draft conditions are encountered, a hydraulic cylinder 22 is provided for each earth-working unit and is pivoted at 23 upon the plow frame. A piston 24 is slidable in the cylinder and is provided with a rod 25 pivotally connected to the upper end of tool standard or shank 17.

The hydraulic cylinders 22 are part of a fluid circuit designated 26, which also includes a master cylinder 27, shown diagrammatically in FIGURE 1. It may be understood that a piston 28 is slidable in cylinder 27 and traps fluid 29 therebetween and the end 30 of the cylinder which has an opening therein communicating with fluid-transmitting tube 31, having branches 32 and 33 leading to the individual earth-working units 16. It should be understood that fluid is trapped in the conduits and in cylinders 22 and 27, and when an earth-working unit 16 trips, piston 24 is moved forwardly, piston 28 in master cylinder 27 likewise moves forwardly and a rod 34, connected thereto, has its other end connected to the upper end of a lever 35.

Lever 35 is fulcrumed medially of its ends at 36 on the plow frame and its lower end is pivotally connected to a hitch bar 37, the forward end of which is mounted on a hitch pin 38 carried by the drawbar 11. An arm 39 pivoted at its lower end on the drawbar 11 has its upper end pivotally connected to the forward end of frame 13. Thus, the forward thrust of piston rod 34 on lever 35, as a result of tripping of one or more of the earth-working units 16 causes the implement to momentarily move toward the tractor. This acceleration of the implement occurs as a result of the diminished tractive effort required to pull an implement when one of the earth-working units is suddenly released from the ground. Because of the relatively large masses involved, the tripping action of one or more of the earth-working units 16 causes considerable impact loading on the hydraulic system. To overcome this disadvantage, applicant has incorporated in the hydraulic circuit 26 a hydraulic shock absorber or accumulator 40 mounted on the plow frame and communicating with conduit 31. Fluid accumulates in the base of a cylinder 41 and engages a piston 42. A coil spring 43 is confined between piston 42 and the other end of the cylinder to maintain pressure in the circuit, and a rod 44 connected to the piston 42 is threaded at its end and projects through an opening in said other end of the cylinder. A nut 45 on the threaded end of rod 44 engages the cylinder head and is utilized to adjust the tension on spring 43 and therefore the point at which it will yield in response to the pressure increase in the circuit caused by tripping of one or more of the plow units 16.

It may be understood that master cylinder 27 shown in FIGURE 1 is connected to a suitable fluid reservoir, not shown, whereby fluid may be replenished in the circuit should any leakage occur therefrom.

Figure 2:
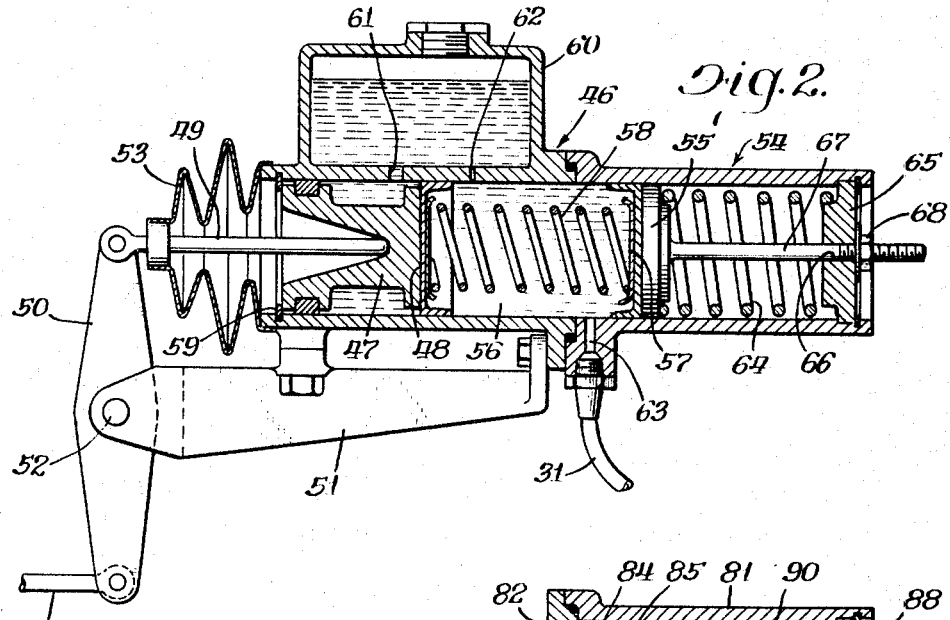
FIGURE 2 is an enlarged sectional view of a master cylinder similar to that shown diagrammatically in FIGURE 1, but with the shock absorber incorporated therein.

FIGURE 2 illustrates a modified form of the master cylinder shown diagrammatically in FIGURE 1 and includes an elongated cylindrical body 46 in one end of which is provided a piston 47 having a seal 48 at one end and a rod 49 at the other, the outer end of which is connected to the upper end of a lever 50, corresponding to lever 35 in FIGURE 1 and connected at its lower end to the draft bar 37. A bracket 51 supports the cylinder 46 for mounting upon the frame of a plow or the like and provides a fulcrum 52 for lever 50. A dust shield 53 extends between the forward end of cylinder 46 and rod 49.

The other end of the cylindrical body 46 is a shock-absorbing section designated by the numeral 54 and a piston 55 is slidable therein at a location rearwardly of piston 47 to form an oil-filled space 56 therebetween. A fluid seal 57 is provided on piston 55, and a coil spring 58 is confined therebetween and piston 47, and the seals 48 and 57 are held in spaced relation by spring 58, the outermost limit of piston rod 47 being defined by a stop member 59.

A reservoir 60 is mounted on the cylindrical body 46, a charging port 61 and a compensating port 62 being provided and communicating with the cylinder proper. A port 63 communicates with conduit 31.

A coil spring 64 is confined between piston 55 and a plug 65, the latter having an opening 66 therein which slidably receives a rod 67 connected to piston 55, and the outer end of the rod 67 projecting beyond plug 65 is threaded to receive a nut 68 engageable with plug 65 and operable to adjust the tension on spring 64.

Figure 4:
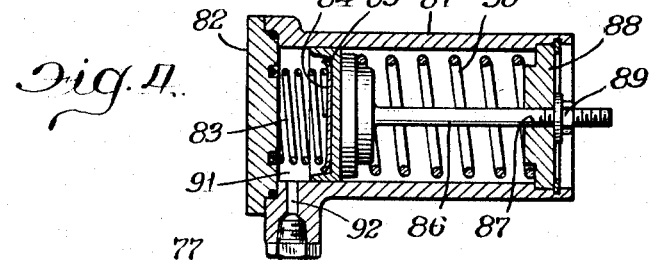
FIGURE 4 is an enlarged cross-sectional view of the shock absorber shown in FIGURE 3.
Figure 3:
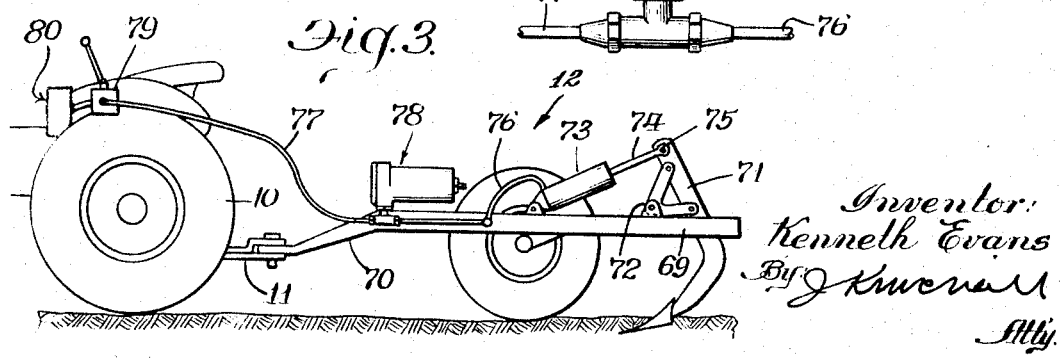
FIGURE 3 is a diagrammatic side elevation of a modified form of the invention shown in FIGURE 1, wherein the master cylinder is eliminated and a shock absorber substituted therefor.

In another form of the invention shown in FIGURES 3 and 4, an implement frame 69 is connected by a conventional hitch structure 70 to the tractor drawbar 11, and an earth-working tool standard 71, which may be considered one of a plurality of such standards carried by the implement, is mounted on the frame 69 for pivoting relative thereto about a transverse axis 72.

A hydraulic cylinder 73 similar to cylinder 22 in FIGURE 1, one being provided for each earth-working unit, is pivotally mounted on the frame and has a piston rod 74 slidable therein and connected at 75 with the upper end of standard 71. A closed hydraulic circuit is represented by conduits 76 and 77 and a hydraulic-fluid-receiving member 78, conduit 77 extending forwardly from the implement and being connected to a control valve 79 on the tractor, which valve, in turn, is connected to a source of fluid under pressure, of any well-known type, indicated at 80. Valve 79 may be opened to replenish fluid in the implement circuit but is normally closed. Member 78 functions as an accumulator or shock absorbed and, as shown in FIGURE 4, it includes a cylindrical housing 81 having at one end a head 82 engaging one end of a spring 83, the other end of which engages a sealing member 84 abutting a piston 85 having a rod 86 threaded at its end and slidable through an opening 87 in a plug 88 at the other end of the cylinder. A nut 89 threaded on rod 86 engages plug 88. By adjusting nut 89, the tension can be regulated on a spring 90 surrounding the rod and confined between piston 85 and plug 88. The oil space 91 occupied by spring 83 communicates through port 92 with the conduits 76 and 77.

Upon tripping the earth-working unit 71 pressure on the fluid in the circuit is relieved by the yielding of spring 90 from the force of the oil entering the area 91. Spring 83 functions like spring 58 to maintain the position of sealing member 84.

It is believed that the construction and operation of the earth-working implement control apparatus of this invention will be clearly understood from the foregoing description. It should likewise be understood that this invention has been described in its preferred embodiments only and that modifications may be made therein without departing from the spirit of the invention or the scope of the appended claims.

I claim:

1. In an earth-working implement having a supporting frame and a connection to a tractive vehicle, an earth-penetrating tool mounted on the frame for tripping in response to abnormal draft load on the tool and a closed hydraulic fluid circuit carried by the frame including means serving as a slave cylinder mounted on the frame and operatively connected to said tool so as to place the fluid in said cylinder under pressure in one direction when draft load is applied to the tool, means serving as a master cylinder in said circuit having a piston slidable therein operatively connected to said vehicle in draft-receiving relation to place the fluid in said circuit under pressure and having a fluid connection with said slave cylinder for moving said piston in the other direction in response to abnormal draft load on the tool to oppose tripping of the tool, and a shock absorber in said circuit between said master cylinder and said slave cylinder in communication with the fluid in said circuit for absorbing excess pressure in said circuit when said tool trips, said shock absorber comprising a cylindrical housing, a movable member slidably mounted in said housing in engagement with the fluid in said circiut and movable in one direction in response to pressure increase in said circuit, yieldable means mounted in said houseing therebetween and said movable member, an elongated part secured to said movable member and projecting from said housing, and adjustable means cooperative between said part and said housing for adjusting the tension on said yieldable means.

2. In an earth-working implement having a supporting frame and a connection to a tractive vehicle, an earth-penetrating tool mounted on the frame for tripping in response to abnormal draft load on the tool and a closed hydraulic fluid circuit carried by the frame including means serving as a slave cylinder mounted on the frame and operatively connected to said tool so as to place the fluid in said cylinder under pressure in one direction when draft load is applied to the tool, means serving as a master cylinder in said circuit having a piston slidable therein operatively connected to said vehicle in draft-receiving relation to place the fluid in said circuit under pressure and having a fluid connection with said slave cylinder for moving said piston in the other direction in response to abnormal draft load on the tool to oppose tripping of the tool, a shock absorber in said circuit between said master cylinder and said slave cylinder in communication with the fluid in said circuit for absorbing excess pressure in said circuit when said tool trips, and means for adjusting said shock absorber to vary the pressure in said slave cylinder and therefore the draft load required to trip said tool.

3. In an earth-working implement having a supporting frame and a connection to a tractive vehicle, an earth-penetrating tool mounted on the frame for tripping in response to draft forces acting on the tool and a closed hydraulic fluid circuit carried by the frame including a slave cylinder operatively connected to said tool so as to place the fluid in said cylinder under pressure in one direction when draft load is applied to the tool, and a combination master cylinder and shock absorber comprising, an elongated cylinder having a piston slidable in one end and operatively connected to said vehicle in draft-receiving relation to place the fluid in said circuit under pressure in the other direction to oppose tripping of the tool, means serving as another piston slidable in the other end of said master cylinder in engagement with the fluid therein, a spring mounted in said master cylinder between said other piston and the other end of the master cylinder to resist movement of said other piston in response to changes in pressure when the tool is tripped, said other end of the master cylinder having an opening therein, and means for adjusting the tension of said spring comprising a rod carried by said other piston slidably receivable in said opening and projecting exteriorly of said master cylinder and adjustable means cooperative between said rod and said master cylinder to adjust the tension of the spring.

References Cited by the Examiner

UNITED STATES PATENTS

| | | | |
|---|---|---|---|
| 1,398,859 | 11/1921 | Hurtig et al. | 172—705 |
| 1,808,209 | 6/1931 | Earl | 137—568 X |
| 2,074,609 | 3/1937 | Hooper | 280—124 |
| 2,379,779 | 7/1945 | Ash | 172—605 |
| 2,572,190 | 10/1951 | Patrick | 137—593 |
| 3,172,481 | 3/1965 | Trollsas | 172—261 |

FOREIGN PATENTS 988,559   5/1951   France.

ANTONIO F. GUIDA, *Acting Primary Examiner.*
ABRAHAM G. STONE, *Examiner.*
R. L. HOLLISTER, *Assistant Examiner.*